United States Patent [19]

Isikawa

[11] 4,089,488

[45] May 16, 1978

[54] TAPE TRANSPORT APPARATUS

[76] Inventor: Kiyosi Isikawa, c/o Omron Tateisi Electronics Co., 10, Hanazono Tsuchidocho, Ukyo-ku, Kyoto, Japan, 615

[21] Appl. No.: 677,790

[22] Filed: Apr. 16, 1976

[30] Foreign Application Priority Data

Apr. 24, 1975 Japan .............................. 50-56549[U]
Nov. 17, 1975 Japan ........................... 50-156748[U]

[51] Int. Cl.² ....................... G11B 15/32; B65H 17/14
[52] U.S. Cl. .................................................. 242/192
[58] Field of Search ............... 242/192, 195, 201, 202, 242/197, 67.5, 210, 54.1

[56] References Cited

U.S. PATENT DOCUMENTS

| 2,743,878 | 5/1956 | Masterson | 242/192 |
| 3,468,497 | 9/1969 | Kelley | 242/192 |
| 3,773,276 | 11/1973 | Ganske | 242/192 |
| 3,802,645 | 4/1974 | Furst | 242/192 |
| 3,808,902 | 5/1974 | Grant | 74/227 |
| 3,907,230 | 9/1975 | Merle et al. | 242/192 |

Primary Examiner—George F. Mautz
Attorney, Agent, or Firm—Christensen, O'Connor, Johnson & Kindness

[57] ABSTRACT

A tape transport apparatus comprising a drive pulley, a driven pulley, a belt of an elastic material passing about the drive and driven pulleys, a supply and a takeup roll of pliable tape both urged against the belt at substantially diametrically opposite sides of the driven pulley. When the belt runs, a tensioned portion and a slackened portion are formed in the belt at the opposite sides of the pulleys. The slackened and tensioned portions are in frictional contact with the supply and takeup rolls, respectively, to rotate them so that the tape is withdrawn from the supply roll and wound onto the takeup roll. The tensioned belt portion has a smaller cross-sectional area than the slackened belt portion so that the former portion runs at a higher speed than the latter. The speed difference causes the tape to be wound on the takeup roll at a higher speed than where it is withdrawn from the supply roll until the tape becomes properly tensioned between the supply and takeup rolls.

14 Claims, 5 Drawing Figures

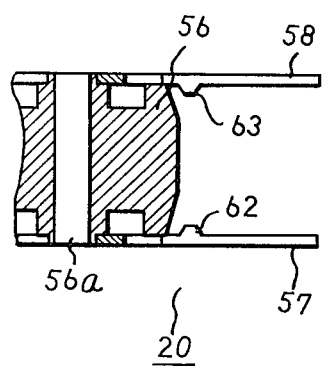
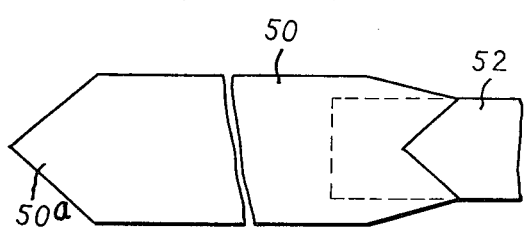
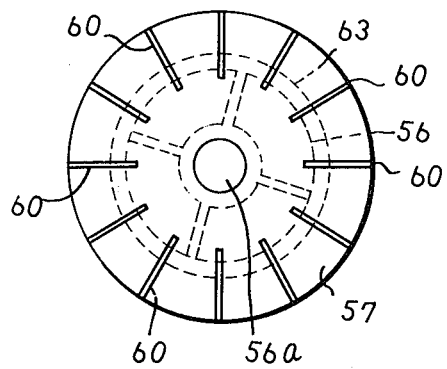

TAPE TRANSPORT APPARATUS

This invention relates to a tape transport apparatus and more particularly to an apparatus for transporting a length of pliable magnetic tape from a supply to a takeup roll in a magnetic recording apparatus and the like.

In most known magnetic recording devices, the magnetic tape on which data are to be recorded or from which the recorded data are to be read is unwound from a supply roll and transported to be wound on a takeup roll. As the tape is transported from the supply to the takeup roll, it passes a magnetic recording and/or reading head.

For proper recording and reading, it is required that an appropriate tension should be applied to the tape as it passes the magnetic head between the supply and takeup rolls. Such tension can be applied to the tape by moving the tape slightly faster when it is wound onto the takeup roll than when it is withdrawn from the supply roll. To obtain such speed difference, in one prior art arrangement a positively driven capstan having a resilient circumferential surface is disposed between a supply and a takeup roll in such a manner that the two rolls are pressed against the resilient circumferential surface of the capstan, with the pressing force between the capstan and the takeup roll being greater than the pressing force between the capstan and the supply roll.

As is well known, a local area of the capstan on which a greater pressing force is exerted is more compressed and consequently has a smaller cross-sectional area than a local area thereof on which a smaller pressing force is exerted, and the local area having the smaller cross-sectional area has a higher speed than the local area having the larger cross-sectional area. Therefore, that portion of the tape which is wound onto a takeup roll tends toward a higher speed than that portion of the tape which is withdrawn from the supply roll. This difference in speed causes the tape to be always tensioned as it is transported from the supply to the takeup roll.

In this prior art arrangement, however, the radii of both the supply and takeup rolls change as the winding operation proceeds, so that it is necessary to change the pressing force which the capstan exercises on the rolls as the operation procceds. Generally, such a pressing force can conveniently be provided by means of a spring. However, if the pressing force provided by a spring is to be changed, the spring characteristics must be changed with the continuously changing radii of the rolls, and the mechanism and control therefor are very much complicated and troublesome. Moreover, when the direction of transport of the tape is to be reversed, the magnitudes of the above-mentioned pressures on the supply and takeup rolls must also be reversed, and the mechanism and control therefor are also very complicated and troublesome.

Accordingly, the primary object of the invention is to provide a tape transport apparatus wherein an appropriate tension can be applied to the tape being transported from the supply to the takeup roll.

Another object of the invention is to provide a tape transport apparatus wherein the pressures exerted on the peripheries of the supply and takeup rolls are maintained at substantially the same level by means of a simple mechanism and at the same time the speed at which the tape is wound onto the takeup roll tends toward a greater speed than the speed at which the tape is paid out from the supply roll.

Amother object of the invention is to provide a tape transport apparatus wherein the tension applied to the tape being transported can easily be kept at an appropriate level regardless of progression of the winding operation without the necessity of providing a special device for the purpose.

Still another object of the invention is to provide a tape transport apparatus wherein even when the direction of transport of the tape is reversed, the pressing forces on the two rolls can be maintained at substantially the same level without provision of any special device therefor.

Still another object of the invention is to provide a tape transport apparatus wherein a lead tape connected to the outer end of the ordinary tape is initially wound onto a takeup reel, and wherein the pressing force on the takeup roll can easily be made different from that existing when the ordinary tape is wound to thereby assure proper initial winding of the lead tape on the takeup reel.

To attain the above-mentioned and other objects, the apparatus of the invention comprises a drive pulley which is driven by a suitable drive source, a subsidiary pulley driven by the drive pulley and spaced a suitable distance from the drive pulley, and an endless belt passing about the two pulleys.

The belt serves to transmit the rotation of the drive pulley to the driven pulley. The belt is preferably made of a suitable elastic material such that when the belt is tensioned, its cross-sectional area decreases, e.g., silicone rubber, polyurethane rubber, nitrile butadiene rubber, polychloroprene rubber, and other synthetic rubbers.

The outermost turn of the tape in the supply roll and the outermost turn of the tape in the takeup roll are urged against that portion of the endless belt which passes about the driven pulley. The belt is driven about half the circumference of the driven pulley by the drive pulley in such a direction that it comes in between the supply roll and the driven pulley and comes out from between the takeup roll and the driven pulley.

When the outermost turn of the tape in each of the supply and takeup rolls is pressed against the belt running about the driven pulley, friction is produced between the belt and the tape on each roll to transmit the rotation onto the rolls. This causes the outermost turn of the tape in the supply roll to be paid out therefrom to be transported to the takeup roll so as to be wound thereonto.

The tape that has left the supply roll is guided past a magnetic head along a predetermined path before it reaches the takeup roll. The path may be defined by guide pins.

When the belt is circulated in the above-mentioned direction, that portion of the tape that runs toward the interface (to be referred to as the supply interface) between the supply roll and the driven pulley is slackened, while that portion of the tape that is withdrawn from the interface (to be referred to as the takeup interface) between the takeup roll and the driven pulley to run toward the drive pulley is tensioned. It is assumed that no sliding slip occurs between the belt and each of the pulleys.

When the belt transmits power, elastic slip (that is, a lag of the pulley relative to the belt) is naturally caused to occur by the elastic elongation of the belt. Due to the elastic slip, the cross-sectional area of the tensioned portion of the belt becomes smaller than the cross-sectional area of the slackened portion of the belt. In other words, the cross-sectional area of the belt adjacent the takeup interface becomes smaller than that of the belt adjacent the supply interface. It is required, however, that as the belt runs about substantially half the circumference of the driven pulley, the mass M1 of the material of the belt that passes the supply interface per unit period of time should be equal to the mass M2 of the material of the belt that passes the takeup interface per unit period of time. Otherwise, the belt passing semicircularly about the driven pulley has one portion thereof slackened and other portion tensioned so that proper transmission of power would become impossible.

Suppose that when the belt passes the supply interface, it has a cross-sectional area of A1 and a speed of V1, while when the belt passes the takeup interface, it has a cross-sectional area of A2 and a speed of V2. Then M1 = V1A1 and M2 = V2A2. As previously mentioned, however, M1 = M2 and A1 > A2. Therefore, V1 < V2. This means that the speed V2 of the belt at the takeup interface is higher than the speed V1 thereof at the supply interface. The difference between the two speeds V2 − V1 causes the tape to be tensioned as it is unwrapped from the supply roll to be transported onto the takeup roll.

A spring may conveniently be used to provide the force with which the supply and takeup rolls are pressed against the belt about the driven pulley. In the prior art devices of the type, two separate springs were generally used, one for the supply roll and the other for the takeup roll. In the present invention, however, a single spring suffices which is interposed between a spaced pair of swingable arms so as to urge them toward each other. One of the arms has a supply roll rotatably mounted thereon while the other has a takeup roll rotatably mounted thereon.

As the winding operation of the tape proceeds, the radius of the supply roll decreases, whereas that of the takeup roll increases. Therefore, the distance between the axes of rotation of the two rolls are substantially constant, so that the pressing force exerted by the spring on the two rolls remains substantially unchanged during the winding operation.

Since the arrangement of the present invention is such that the speed difference enough to tension the tape can be provided without the necessity of making the pressing forces at the supply and takeup interfaces differ from each other as in the prior art, the above fact that there occurs no difference between the pressing forces of the supply and takeup rolls against the belt in the course of winding operation would cause no trouble. Rather no such difference should be produced.

In some small-sized tape recorders, a lead tape is annexed to the outer end of the magnetic tape in order to make easier automatic initial wrapping of the outer end of the lead tape onto the takeup reel. Generally speaking, such lead tape is made of a material harder and has a thickness greater than ordinary magnetic tape. Therefore, is such lead tape is handled by the apparatus so designed as to produce a predetermined speed difference V2 − V1 suitable for application of a required tension to ordinary tape, it may sometimes be impossible to produce a speed difference sufficient to appropriately tension the lead tape.

One way to avoid this is to provide a speed difference greater that the value V2 − V1 required for winding of ordinary tape only when the lead tape is wound. To this end, in the apparatus of the invention while the lead tape is being wound, the pressing force with which the takeup roll is pressed against the belt is increased to reduce the cross-sectional area A2 of the belt at the takeup interface to a value A2' which is smaller than the above-mentioned cross-sectional area A2 obtained when the ordinary tape is wound.

The relation M1 = M2 still applies to this case, so that the speed V2' of the belt at the takeup interface when the lead tape is would onto the takeup reel becomes higher than the speed V2 of the belt when the ordinary tape is wound onto the takeup roll. As a result, the speed difference (V2' − V1) becomes greater than the speed difference (V2 − V1), so that a greater tension is applied to the lead tape than the tension applied to the ordinary tape. This enables winding of the lead tape onto the takeup reel without any slackening therein. Obviously, if the lead tape has been wound without being slackened, the following ordinary tape can also be wound thereon without being slackened.

The invention will be further described with reference to the accompanying drawings, wherein:

FIG. 3 is a partly cut-away top plan view of a lead tape;

FIG. 4 is a top plan view of a reel suitable for winding a lead tape thereon; and FIG. 5 is a sectional view of a portion of the reel shown in FIG. 4.

Figure 1:
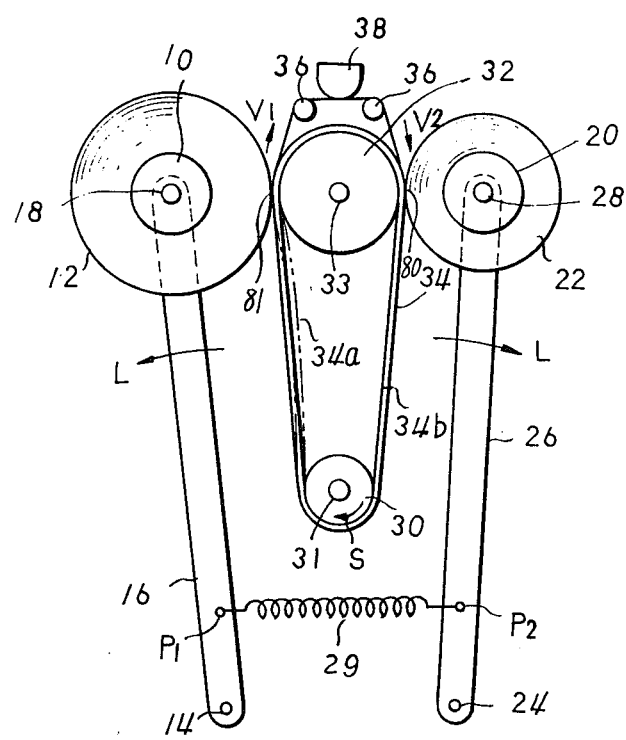
FIG. 1 is a schematic top plan view of one embodiment of the invention.

Referring to the drawings, there is shown a supply roll 12 comprising a length of pliable magnetic tape wound on a supply hub or reel 10. Data are to be recorded on the tape or the recorded data are to be read from the tape. The tape is unwrapped from the roll 12 to be transported past a magnetic head to a takeup roll 22 wound on a takeup hub or reel 20.

The supply reel 10 is rotatably mounted by a pin 18 on the free end of an arm 16 which is pivotable about a pin 14. Similarly, the takeup reel 20 is rotatably mounted by a pin 28 on an arm 26 pivotable about a pin 24. A coil spring 29 has its opposite ends fixed by a pair of pins P1 and P2 to the arms 16 and 26 so as to bias the two arms toward each other. To mount the hubs 10 and 20 on the respective arms 16 and 26, the arms may be moved apart from each other against the force of the spring 29.

A drive pulley 30 is rotated about a shaft 31 by a motor or otherwise. When the tape is to be transported from the supply roll 12 to the takeup roll 22, the pulley 30 is rotated in the direction of an arrow S. When the tape is to be transported in the reverse direction, the pulley 30 is rotated in the direction opposite to the direction S.

A subsidiary or driven pulley 32 is interposed between the two rolls 12 and 22 and is rotatable about a shaft 33. An endless belt 34 passes about the pulleys 30 and 32 so that the rotation of the pulley 30 is transmitted by the belt 32 to the pulley 32.

When the pulley 30 is rotated in the direction S, that portion 34a of the belt 34 that runs from the drive pulley 30 to the driven pulley 32 is slackend as shown by dot-and-dash lines, while that portion 34b of the belt 34 that runs from the driven pulley 32 to the drive pulley 31 is tensioned, because the portion 34b is being pulled by the drive pulley 31.

The belt 34 is made of such an elastic material that when tension is applied to the belt, its cross-sectional area decreases. The smaller the cross-sectional area becomes, the greater the speed difference $V_2 - V_1$ becomes.

It is preferable that the driven pulley 32 has its axis of rotation positioned on a line connecting the axles 18 and 28 of the supply and takeup hubs 10 and 20. The outer surface of the peripheral turn of the supply roll 12 is contacted by the outer surface of the belt 34 adjacent to where the belt comes to contact the driven pulley 32. The outer surface of the peripheral turn of the takeup roll 22 is contacted by the outer surface of the belt 34 adjacent to where the belt leaves the driven pulley 32.

Since the rolls 12 and 22 are pressed against the belt 34 by the force of the spring 29, the supply roll 12 is rotated counterclockwise, the driven pulley 32 is rotated clockwise, and the takeup roll 22 is rotated counterclockwise, so that the tape is paid out from the supply roll 12 to be wound onto the takeup roll 22.

A pair of guide pins 36 define the path along which the tape runs from the roll 12 to the roll 22, passing a magnetic head 38 which magnetically records data on the tape or reads data therefrom.

Upon rotation of the drive pulley 30, the belt 34 circulates between the two pulleys 30 and 32 without slipping. When the belt 34 run along half the circumference of the driven pulley 32, the cross-sectional area $A_2$ of the belt 34 at the interface 80 where the takeup roll 22 is pressed against the driven pulley 32 becomes smaller than the cross-sectional area $A_1$ of the belt 34 at the interface 81 where the supply roll 12 is pressed against the belt 34, with the speed $V_2$ of the belt at the takeup interface 80 being higher than the speed $V_1$ thereof at the supply interface 81.

Due to the speed difference $V_2 - V_1$, the speed (takeup speed) at which the tape is wound onto the takeup roll 22 tends higher than the speed (supply speed) at which the tape is paid out from the supply roll 12, so that the tape being transported from the supply roll 12 to the takeup roll 22 is appropriately tensioned and properly wound onto the takeup roll 22 without occurrence of any slackening, wrinkles, etc.

As the winding operation proceeds, the radius of the supply roll 12 decreases while that of the takeup roll 22 increases. This causes the arms 16 and 26 to be moved clockwise about the pivots 14 and 24, respectively, so that the distance between the two arms 16 and 26 and consequently the pressures with which the supply and takeup rolls 12 and 22 are urged against the driven pulley 32 remain unchanged. In other words, the previously mentioned speed difference $V_2 - V_1$ and the tension on the tape remain unchanged despite the change in the radii of the supply and takeup rolls as the winding operation proceeds.

In order to reverse the direction of transport of the tape, the direction of rotation of the driving pulley 30 is simply reversed, whereupon the belt 34 runs in the opposite direction, so that the tape is unwound from the takeup roll 22 to be wound back onto the supply roll 12. The slackened belt portion 34a now is tensioned while the tensioned belt portion 34b now is slackened, and the speed at which the tape is wound onto supply roll 12 tends higher than the speed at which the tape is paid out of the takeup roll 22, so that the tape is properly tensioned.

Figure 2:
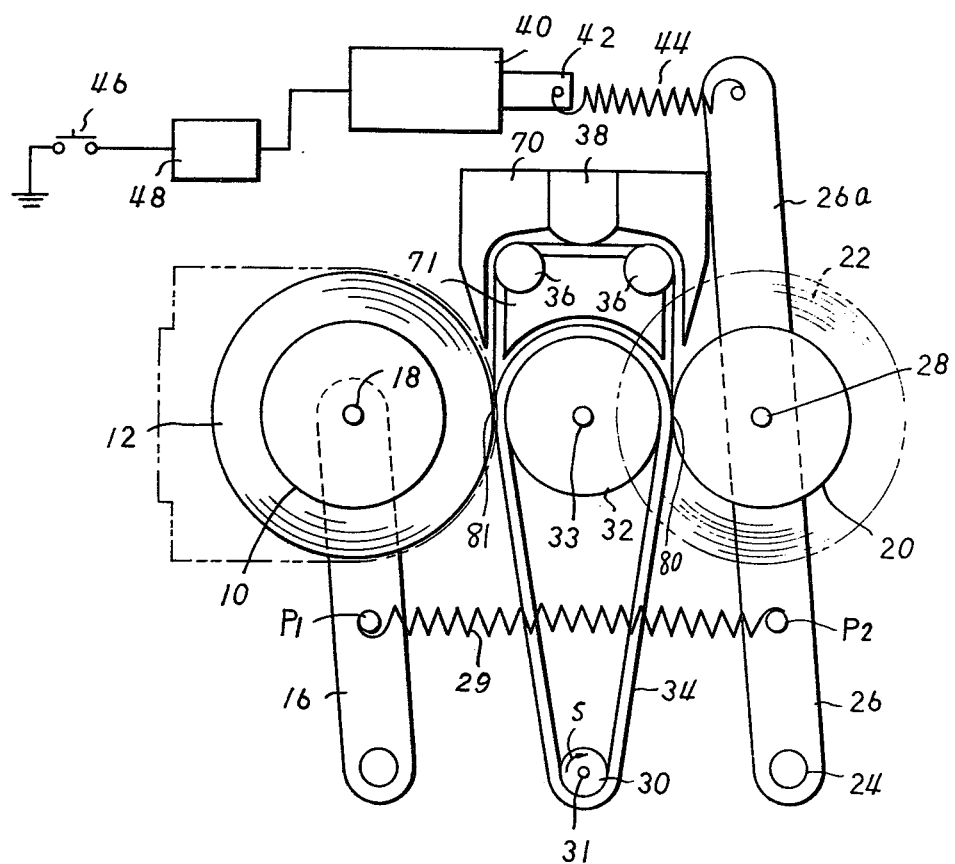
FIG. 2 is a schematic top plan view fof another embodiment of the invention.

In order to assure that the lead tape is initially wound on the takeup reel 20 without fail, the pressure between the takeup reel 20 and the belt 34 is increased by providing the arm 26 with an extension 26a, the outer end of which is connected by a spring 44 to a plunger 42 adapted to be pulled by a solenoid 40 (FIG. 2).

When a button 46 is pressed, a signal is applied to a control circuit 48 including a timer, the output of which energizes the solenoid 40 to pull in the plunger 42, thereby causing the arm 26 to be tilted to the left to press the takeup reel 20 against the belt 34. This pressure reduces the cross-sectional area $A_2$ of the belt 34 at the takeup interface 80 to $A_2'$ which is smaller than the cross-sectional area $A_2$ thereof when the arm 26 is not pulled by the plunger 42. With the reduced cross-sectional area $A_2'$, the speed $V_2'$ of the belt 34 becomes higher than the speed $V_2$ thereof when the arm 26 is not additionally urged by the plunger 40, so that a greater tension is applied to the lead tape than when the ordinary tape is being wound.

The time constant of the timer included in the control circuit 48 is set to a time required for the lead tape to have been completely wound on the takeup reel 20. When the winding of the lead tape has been completed, the output from the control circuit 48 terminates so that the plunger 42 is released to restore the arm 26 to its original position. After then, the ordinary tape following the lead tape is wound onto the takeup reel 20 just as in the embodiment of FIG. 1.

As shown in FIG. 3, the lead tape 50 has a triangularly pointed outer end 50a to enable automatic insertion thereof into the takeup reel 22 and an inner end connected to the ensuing ordinary tape 52. The tape is longer than the circumference of the takeup reel.

In order to enable easy and smooth insertion of the lead tape 50 onto the takeup reel 20, this reel 20 comprises a takeup hub 56 formed with an axial through bore 56a for insertion of the shaft 28 therethrough, and a spaced pair of flanges 57 and 58 secured to the opposite axial ends of the hub (FIGS. 4 and 5). A plurality of radial slits 60 are formed on the flanges 57 and 58. The lead tape is inserted between the flanges 57 and 58 tangentially to the peripheral surface of the takeup hub 56, whereupon the opposite lateral side edges of the lead tape push apart opposed sectors of the flanges 57 and 58 defined by the radial slits 60 for easy insertion of the lead tape.

On the axially inwardly opposed surfaces of the flanges 57 and 58 there are formed an opposed pair of annular projections 62 and 63 adjacent to the peripheral surface of the takeup hub. The outer end of the lead tape that has been introduced between the pair of flanges 57 and 58 advances over the annular projections into the space radially inside the projections so as to come into contact with the peripheral surface of the takeup hub 56.

Since the lead tape 50 as well as the ordinary tape 52 were wound on the supply roll 12 counterclockwise, the memory of the material of the lead tape tends to restore the tape to the deflected or curved condition as the tape was on the supply roll even after the tape has been withdrawn therefrom. The memory is maintained while the lead tape is guided along a path defined by guide members 70 and 71 between the supply and takeup rolls. When the lead tape leaves the path to arrive at the peripheral surface of the takeup hub of the takeup reel 20, the memory of the material of the lead tape functions to cause the lead tape to be naturally wound about the takeup hub. Needless to say, once a portion of the lead tape has thus been wound on the takeup hub, the following portion of the lead tape and the ordinary tape 50 are continuously wound thereon to form a takeup roll.

The invention is applicable to a length of film, ribbon tape and similar strips as well as the above-mentioned magnetic tape.

Since the apparatus of the invention comprises a driving pulley, a driven pulley, an endless belt between the two pulleys, and means for resiliently urging a supply and a takeup roll against the driven pulley, the number of the component parts is small and the mechanisms is simple and compact.

The direction of transport of the tape can be reversed by simply reversing the rotational direction of the drive pulley and consequently that of the endless belt, so that the control is quite simple.

Another advantage is that no control of the pressure exerted by the urging means on the two rolls is required regardless of progression of the tape winding operation.

What I claim is:

1. A tape transport apparatus comprising a supply hub on which a length of pliable tape is wound to form a supply roll thereon; a takeup hub onto which the tape that is unwound from said supply roll is wound to form a takeup roll on said takeup hub; a drive pulley; a driven pulley paired with said drive pulley; an endless belt passing about said drive and driven pulleys so that said belt when driven forms relatively slackened and tensioned portions that exhibit a difference in speed, said slackened belt portion being in frictional contact with a peripheral turn of said tape on said supply roll so as to rotate said supply roll thereby causing said tape to be paid out therefrom and said tensioned belt portion being in frictional contact with a pheripheral turn of said tape on said takeup roll so as to rotate said takeup roll thereby causing the paid out tape to be wound onto said takeup roll; the speed difference between said tensioned and slackened belt portions tending to cause the tape to be wound onto said takeup roll at a faster rate than the rate at which said tape is withdrawn from said supply roll, thereby tensioning said tape running between said supply and takeup rolls; and resilient means for urging said supply and takeup rolls toward said belt, said resilient means being arranged with respect to said driven pulley and said belt so that the peripheral turn of the tape on said supply roll is initially brought into said frictional contact with the slackened portion of said belt at the point at which said belt initially joins said driven pulley, and so that the peripheral turn of said takeup roll separates from said frictional contact with the tensioned portion of said belt at the point at which said belt leaves said driven pulley.

2. The apparatus of claim 1, wherein said belt is made of an elastic material so that the cross-sectional area of said tensioned belt portion becomes smaller than that of said slackened belt portion.

3. The apparatus of claim 2, wherein said belt is made of rubber.

4. The apparatus of claim 2, wherein said belt is made of synthetic rubber.

5. The apparatus of claim 1, further including a plurality of guide pins for defining a path along which said tape is transported from said supply roll to said takeup roll.

6. The apparatus of claim 5, wherein said tape is a magnetic tape and a magnetic head is provided in said guide path so as to be in contact with said tape being transported along said path.

7. The apparatus of claim 1, wherein said supply hub is mounted adjacent one side of said driven pulley for movement toward and away from said slackened portion of said belt and wherein said takeup hub is mounted adjacent a side of said driven pulley that is generally diametrically opposite to said supply hub for movement toward and away from said tensioned portion of said belt, and wherein said resilient means comprises a spring provided between said supply and takeup hubs to urge them toward each other.

8. The apparatus of claim 7, wherein said supply hub is rotatably mounted on a first arm swingable about a pivoted end and said takeup hub is rotatably mounted on a second arm swingable about a pivoted end, and said spring has its opposite ends respectively connected to said first and second arms to pull them toward each other.

9. The apparatus of claim 1, wherein said tape has a lead tape annexed to the outer end thereof; and further including means for increasing the force with which said resilient means urges said takeup roll toward said belt while said lead tape is wound onto said takeup hub, thereby increasing the difference between the speed of said tensioned belt portion, and that of said slackened belt portion when said lead tape is being wound onto said takeup hub so as to increase the tension on said lead tape.

10. The apparatus of claim 9, wherein said supply hub is rotatably mounted on a first arm swingable about a pivoted end and said takeup hub is rotatably mounted on a second arm swingable about a pivoted end, and wherein said resilient means comprises a first spring connected between said first and second arms to urge said supply and takeup rolls against said belt, and wherein said means for increasing the force comprises an extension on one end of said second arm and means connected to said extension and operable when said lead tape is being wound onto said takeup roll for urging said second arm and said takeup roll toward said belt.

11. The apparatus of claim 10, wherein said means connected to said extension comprises a solenoid, a plunger operated by said solenoid when energized and a second spring connecting said plunger to said extension, said plunger when operated by said solenoid moving said extension via said second spring to urge said second arm and said takeup roll toward said belt.

12. The apparatus of claim 11, further including a control circuit which produces an output signal to energize said solenoid for a predetermined period of time from the start of the winding of the lead tape onto said takeup roll.

13. The apparatus of claim 12, wherein said control circuit includes a timer that establishes said predetermined period of time during which said output signal energizes said solenoid.

14. The apparatus of claim 12, further including a manually operable switch adapted to be operated when the winding of said lead tape is started to produce a signal to cause said control circuit to produce said output signal for said predetermined period of time.

* * * * *